Patented June 9, 1925.

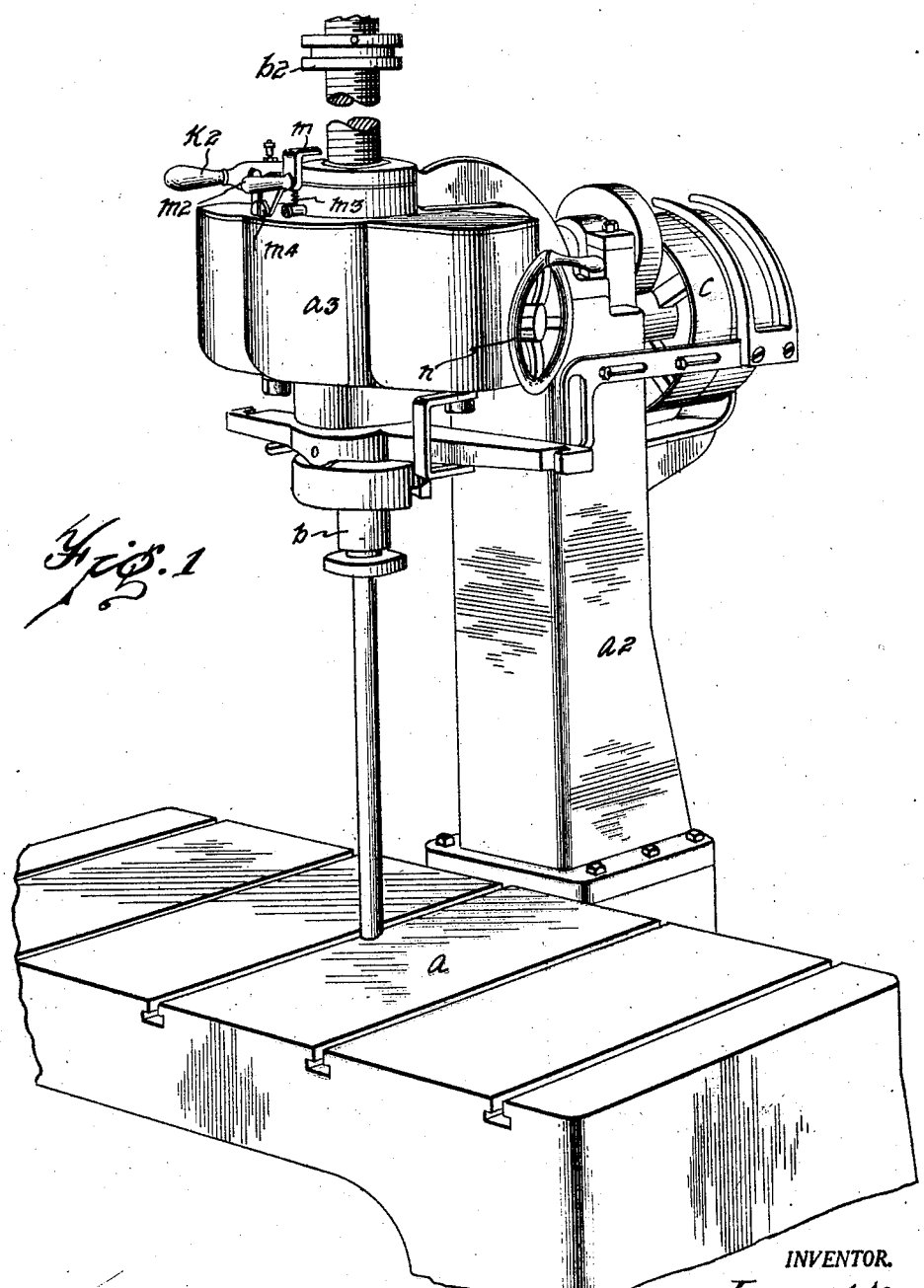

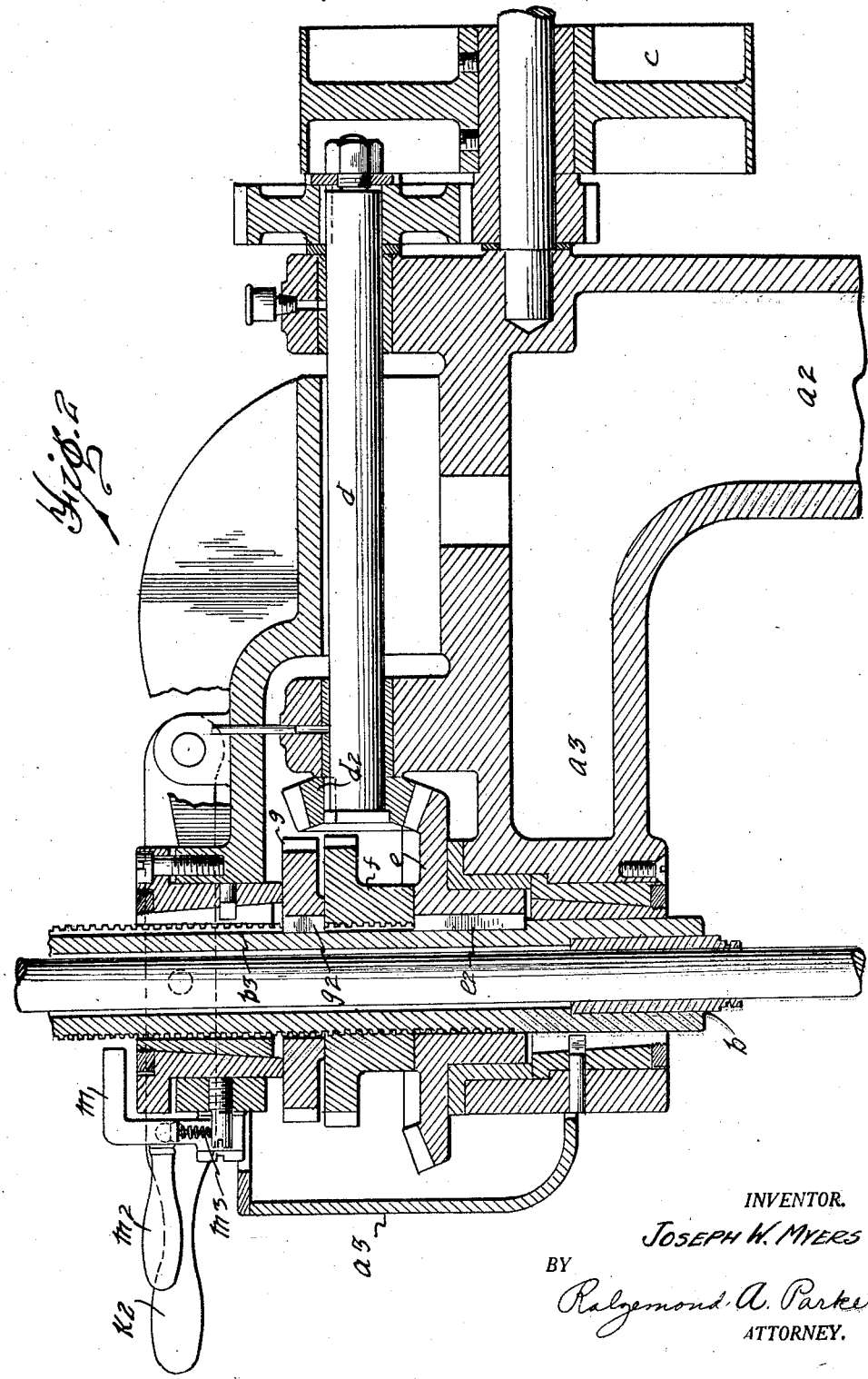

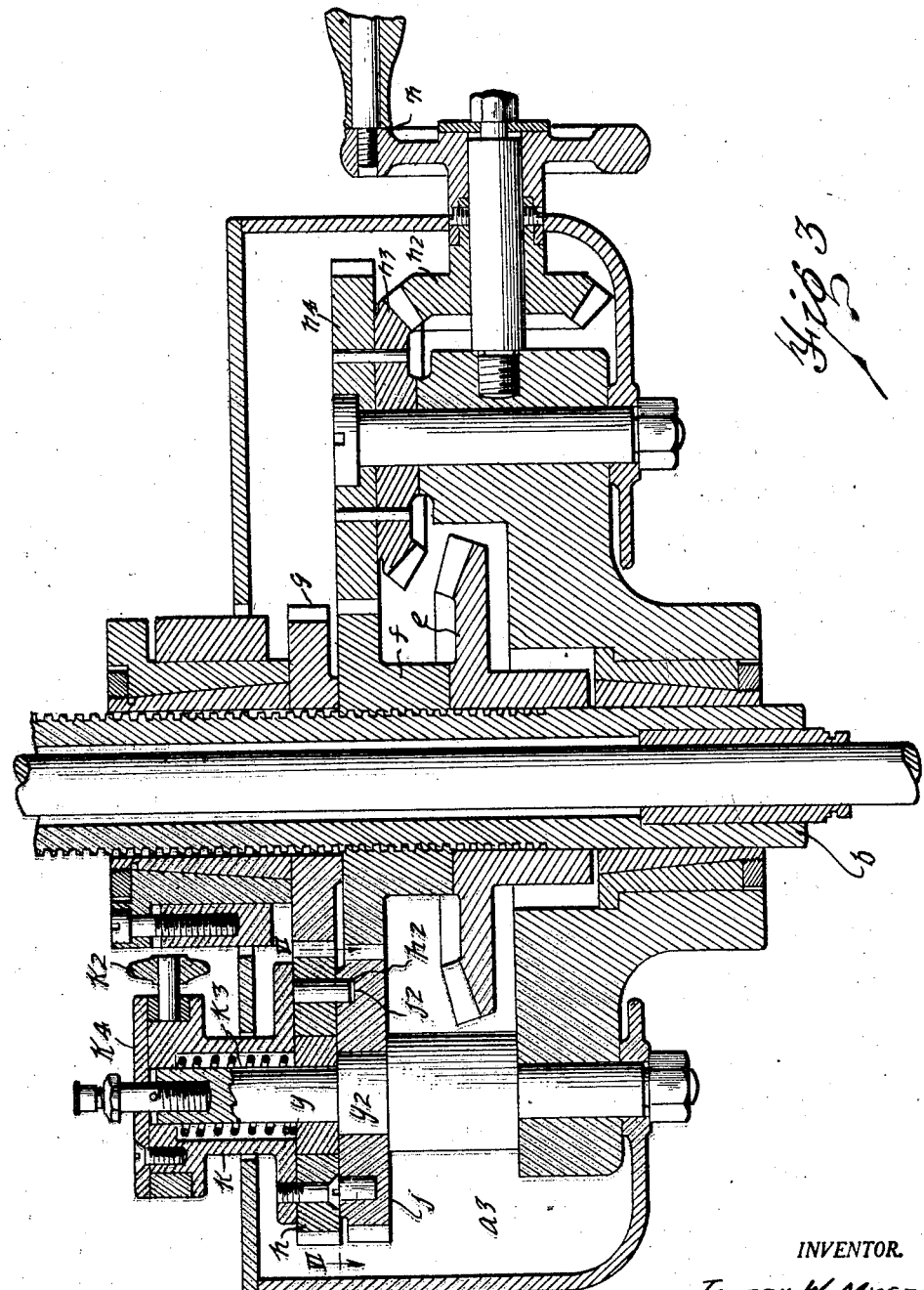

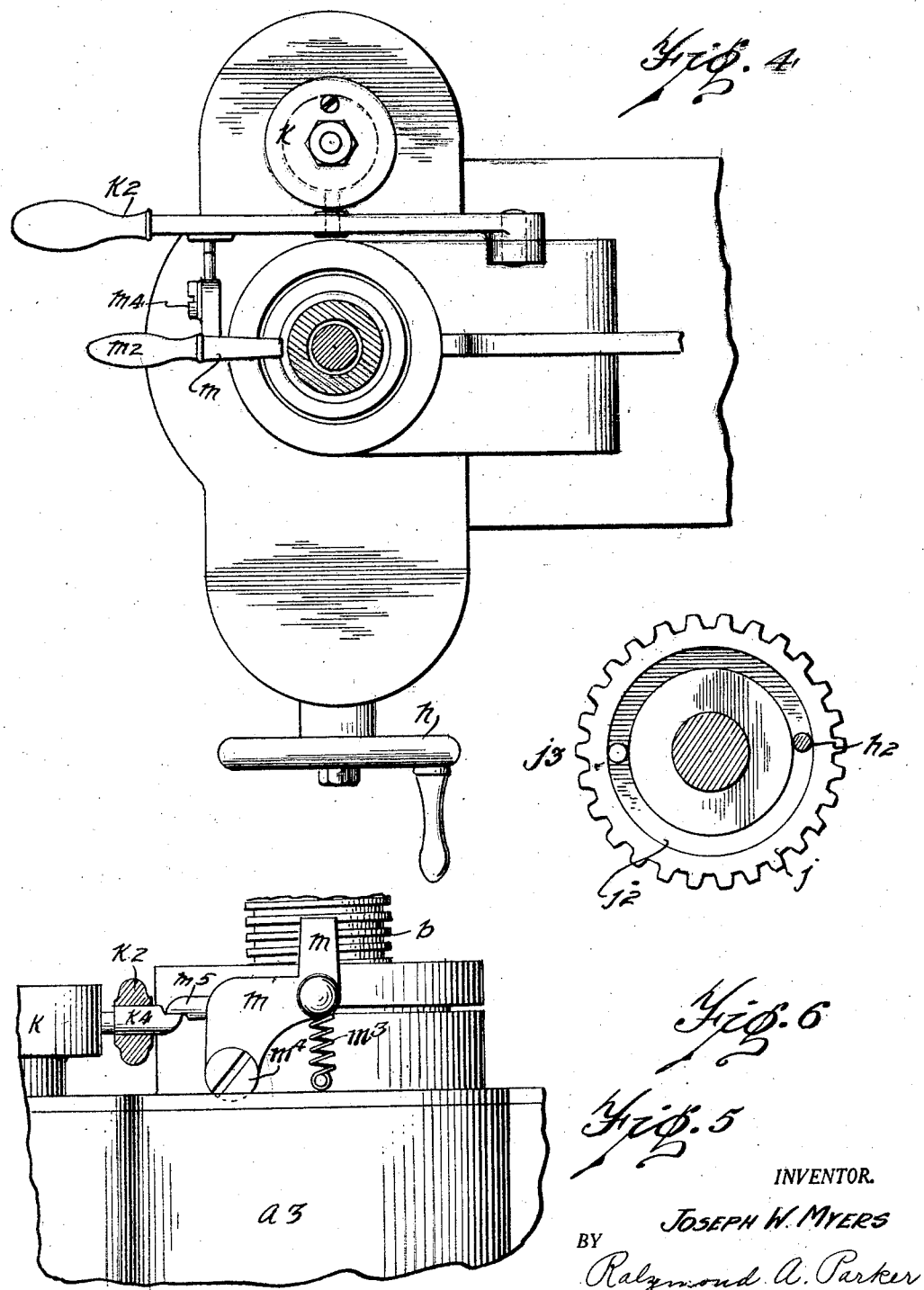

1,541,062

UNITED STATES PATENT OFFICE.

JOSEPH W. MYERS, OF JACKSON, MICHIGAN, ASSIGNOR TO HINCKLEY-MYERS COMPANY, OF JACKSON, MICHIGAN, A CORPORATION.

MACHINE TOOL.

Application filed June 27, 1921. Serial No. 480,520.

*To all whom it may concern:*

Be it known that I, JOSEPH W. MYERS, a citizen of the United States, residing at Jackson, county of Jackson, State of Michigan, have invented a certain new and useful Improvement in Machine Tools, and declare the following to be a full, clear, and exact description of the same, such as will enable others skilled in the art to which it pertains to make and use the same, reference being had to the accompanying drawings, which form a part of this specification.

My invention relates to machine tools and a special object of my improvements is to provide an improved means of operating the spindle. In the drawing I have shown my invention applied to a machine for boring automobile engine cylinders.

Figure 1 is a perspective view of part of a machine embodying my invention.

Fig. 2 is a sectional view of the operating parts to an enlarged scale.

Fig. 3 is a view similar to Fig. 2 in a plane at right angles to the plane of Fig. 2.

Fig. 4 is a plan view of a part of said apparatus.

Fig. 5 is an elevation of a part of the apparatus shown in Fig. 4 looking from the left of said figure, the lever $k^2$ being shown in section.

Fig. 6 is a detailed plan view showing the upper face of the gear wheel $j$.

Referring first to Fig. 1, $a$ is the bed of the machine, $a^2$ the upright or standard, $a^3$ a casing extending from the top of the standard $a^2$ over the bed $a$ and containing most of the operating mechanism. $b$ is the boring bar which extends vertically through the casing $a^3$. $b^2$ is a ring adjustable to different positions upon the boring bar $b$. The function of said ring is to strike against the lever $m$ to trip the mechanism as hereinafter described. $m^2$ is a handle by which the tripping lever $m$ may be manipulated. $m^3$ is a spring holding the lever $m$ in engaging position. $k^2$ is a lever arm by which the mechanism within the casing $a^3$ may be thrown into gear. $c$ is a pulley which receives a belt for operating the mechanism. $n$ is a hand wheel by which the boring bar may be adjusted to different vertical positions as hereinafter described.

Referring now to Fig. 2 illustrating the operative mechanism within the overhanging casing $a^3$. $c$ is the pulley from which the power is derived. This rotates the shaft $d$ through suitable gearing, said shaft extending horizontally into the casing $a^3$ and is provided with a bevel pinion $d^2$ at its inner end. The boring bar $b$ is provided with screw threads on its outer surface and with a longitudinally-extending key-way $b^3$.

$e$ is a bevel gear wheel upon the boring bar $b$ having a key $e^2$ engaging in the key-way $b^3$ in said bar which prevents relative angular motion of the wheel $e$ and boring bar but permits the wheel $e$ to move freely longitudinally of said bar. The pinion $d^2$ engages the bevel gear wheel $e$ to drive the latter.

$f$ is a spur gear wheel surrounding the boring bar $b$ and having internal threads engaging the threads of said bar. The wheel $f$ is just above and rests upon the wheel $e$.

$g$ is a spur gear wheel sleeved upon the boring bar $b$ and having a key $g^2$ engaging in the key-way $b^4$ of the boring bar. The wheel $g$ is just above and rests upon the wheel $f$.

Referring to Fig. 3, $h$ is a spur gear wheel adapted to rotate upon a fixed arbor $y$ parallel to the boring bar, its teeth engaging the teeth of the spur wheel $g$. $j$ is a spur gear wheel bearing upon a portion $y^2$ of the arbor $y$, its teeth engaging the teeth of the gear wheel $f$. The gear wheel $h$ in the operative position of the mechanism is directly above the gear wheel $j$. It will be observed that the gear wheel $g$ is slightly less in diameter than the contiguous gear wheel $f$ and the gear wheel $h$ is slightly greater in diameter than the adjacent gear wheel $j$.

$k$ is a cylindrical standard secured to the gear wheel $h$ co-axial therewith and extending through the corresponding aperture in the wall of the casing $a^3$. The upper end of the standard is provided with a groove and ring of conventional construction, the ring being engaged by an adjacent lever $k^2$ as shown. $k^3$ is a spring acting to force the standard $k$ upward. The upward movement of said standard is limited by a head $k^4$ adjustably connected with the arbor $y$. The standard $k$ is secured to the gear wheel $h$.

$j^2$ is a circular groove cut in the upper surface of the wheel $j$ concentric with said wheel. $j^3$ (Fig. 6) is a fixed pin interposed at one point in the groove $j^2$.

$h^2$ is a pin extending downward from the wheel $h$ and engaging, in the operative position of the mechanism, in the groove $j^2$. The standard $k$ may be forced down against the action of the spring $k^3$ until the pin $h^2$ engages in the groove $j^2$, or said standard may be released and allowed to rise under the influence of the spring $k^3$ until the pin $h^2$ is withdrawn from the groove $j^2$.

$n$ is a handle by which a bevel gear wheel $n^2$ may be rotated. The bevel gear wheel $n^2$ carries with it a bevel gear wheel $n^3$ rigidly secured to which is the spur gear wheel $n^4$, the teeth of which engage the teeth of the wheel $f$.

The operation of the above described device is as follows:

The handle $k^2$ is pressed downward carrying with it the standard $k$ and gear wheel $h$. This engages the pin $h^2$ in the groove $j^2$ and when said pin engages the stop $j^3$ the rotary motion of the wheel $h$ will be conveyed to the wheel $j$.

The shaft $d$ being rotated from the belt $c$ drives the gear wheel $e$ by means of the spur wheel $d^2$ thus turning the boring bar $b$. The rotation of said bar carries with it the spur wheel $g$ which (Fig. 3) rotates the gear wheel $h$ and therefore the gear wheel $j$ from which the motion is conveyed to the gear wheel $f$ which is threaded upon the boring bar. Owing to the difference in the sizes of the wheels $f$, $g$, $h$ and $j$ the rotary motion of the wheel $f$ will be somewhat less than that of the boring bar and owing to this difference in the rate of rotation the wheel $f$ will act as a nut to force the boring bar longitudinally for the purpose of feeding it to its work.

When the standard $k$ has been pressed down by the lever arm $k^2$ as above described, it is held in this position by a pawl or catch $m^5$ upon the tripping lever $m$ engaged by the turning of said lever about its pivot $m^4$ under the influence of the spring $m^3$ (Fig. 2). The catch $m^5$ engages over a catch $k^4$ on the lever $k^2$ thus holding said lever in its depressed position and therefore the mechanism in engagement as described. When the boring bar has descended the required distance for which the ring $b^2$ is adjusted in position on the boring bar, said ring strikes against the lever $m$ rocking it about its pivot $m^4$ and releasing the catch $m^5$. The spring $k^3$ then throws the standard $k$ upward withdrawing the pin $h^2$ from the groove $j^2$ and disengaging the gear wheels $h$ and $j$. The rotation of the boring bar and the wheels $e$ and $g$ keyed thereon will then no longer turn the gear wheel $f$ and feed the boring bar longitudinally.

When the feeding mechanism has been put out of operative engagement as above described one can adjust the bar $b$ to any required position longitudinally thereof by turning the handle $n$ which through the described chain of gearing will turn the wheel or nut $f$ thus moving the boring bar in the direction of its length.

Claims:

1. In an apparatus of the kind described having a threaded boring bar provided with a longitudinal key-way, a power receiving gear wheel sleeved upon said bar and engaging in said key-way, a second gear wheel sleeved upon said bar and having interior threads engaging the threads of said bar, means for engaging said gear wheels together so as to secure differential movement, and automatic means adapted to disengage said gear wheel at a definite position of said boring bar.

2. In an apparatus of the kind described, having a threaded boring bar provided with a longitudinal key-way, a power receiving wheel sleeved upon said bar and engaging in said key-way, a second gear wheel sleeved upon said bar and having interior threads engaging the threads of said bar, and gear wheels $h$, $j$, meshing respectively with the named gear wheels located upon an arbor parallel to said bar and having different diameters, means for engaging the wheels $h$ and $j$ with each other and disengaging the same, and an automatic means adapted to automatically disengage the wheels $h$ and $j$ at a definite position of the boring bar.

3. In an apparatus of the kind described, having a threaded boring bar provided with a longitudinal key-way, a power receiving wheel sleeved upon said bar and engaging in said key-way, a second gear wheel sleeved upon said bar and having interior threads engaging the threads of said bar, and gear wheels $h$, $j$, meshing respectively with the first named gear wheels located upon an arbor parallel to said bar and having different diameters, means for engaging the wheels $h$ and $j$ with each other and disengaging the same, and a lug upon said boring bar adapted to engage the engaging means between the wheels $h$ and $j$ and release the same.

4. In an apparatus of the kind described having a threaded boring bar provided with a longitudinal key-way, a power-receiving gear wheel sleeved upon said bar and engaging in said key-way, a second gear wheel sleeved upon said bar and having interior threads, engaging the threads of said bar, a third gear wheel sleeved upon said bar and having a key engaging in said key-way, the second gear wheel being intermediate the first and third gear wheels, and gear wheels $h$, $j$, upon an arbor parallel to said bar and have different diameters, the gear wheel $h$ engaging the third gear wheel and the gear wheel $j$ engaging the second gear wheel, and means for engaging or disengaging the wheels $h$ and $j$, the one with the other.

5. In an apparatus of the kind described having a threaded boring bar provided with a longitudinal key-way, a power-receiving gear wheel sleeved upon said bar and engaging said key-way, a second gear wheel sleeved upon said bar and having interior threads engaging the threads of said bar, a third gear wheel sleeved upon said bar and having a key engaging in said key-way, the second gear wheel being intermediate the first and third gear wheels, but gear wheels $h$, $j$, upon an arbor parallel to said bar having different diameters, the gear wheel $h$ engaging the third gear wheel $j$ being provided with a concentric groove on its surface adjacent to the wheel $h$, the wheel $h$ being provided with a pin adapted to engage in said groove and means for separating the gear wheel $h$ from the gear wheel $j$ to withdraw said pin from said groove or for permitting said pin to enter said groove, said groove being provided with a stop $j^3$.

6. In an apparatus of the kind described having a threaded boring bar provided with a longitudinal key-way, a power receiving gear wheel sleeved upon said bar and engaging in said key-way, a second gear wheel sleeved upon said bar and having interior threads engaging the threads of said bar, means for engaging said gear wheels together so as to secure differential movement and a spring tending to interrupt said engagement, a catch device for holding said means in position to make said connection and automatic means for releasing said catch.

7. In an apparatus of the kind described having a threaded boring bar provided with a longitudinal key-way, a power receiving gear wheel sleeved upon said bar and engaging in said key-way, a second gear wheel sleeved upon said bar and having interior threads engaging the threads of said bar, a third gear wheel sleeved upon said bar and having a key engaging in said key-way, the second gear wheel being intermediate the first and third gear wheels, and gear wheels $h$, $j$, upon an arbor parallel to said bar and having different diameters, the gear wheel $h$ engaging the third gear wheel and the gear wheel $j$ engaging the second gear wheel, a spring adapted to separate the gear wheels $h$, $j$, a catch device for holding said gear wheels in engagement, and automatic means for releasing said catch.

In testimony whereof I sign this specification.

JOSEPH W. MYERS.